United States Patent
Cutler

(10) Patent No.: US 9,732,960 B2
(45) Date of Patent: Aug. 15, 2017

(54) FUEL MANIFOLD FOR A GAS TURBINE ENGINE

(71) Applicant: United Technologies Corporation, Hartford, CT (US)

(72) Inventor: Kari L. Cutler, Portland, CT (US)

(73) Assignee: United Technologies Corporation, Farmington, CT (US)

( * ) Notice: Subject to any disclaimer, the term of this patent is extended or adjusted under 35 U.S.C. 154(b) by 246 days.

(21) Appl. No.: 14/626,611

(22) Filed: Feb. 19, 2015

(65) Prior Publication Data

US 2015/0233581 A1 Aug. 20, 2015

Related U.S. Application Data

(60) Provisional application No. 61/941,851, filed on Feb. 19, 2014.

(51) Int. Cl.
  *F23R 3/28* (2006.01)
  *F02C 7/22* (2006.01)
  *F02C 7/228* (2006.01)

(52) U.S. Cl.
  CPC .......... *F23R 3/28* (2013.01); *F02C 7/22* (2013.01); *F02C 7/222* (2013.01); *F02C 7/228* (2013.01); *Y10T 29/4932* (2015.01)

(58) Field of Classification Search
  CPC .... F23R 3/28; F02C 7/22; F02C 7/222; F02C 7/228
  See application file for complete search history.

(56) References Cited

U.S. PATENT DOCUMENTS

| 2,806,354 | A | | 9/1957 | Henry et al. | |
|---|---|---|---|---|---|
| 3,775,975 | A | | 12/1973 | Stenger et al. | |
| 5,031,407 | A | * | 7/1991 | Zaremba | F23R 3/283 60/739 |
| 5,197,288 | A | * | 3/1993 | Newland | F02C 7/222 60/734 |
| 5,390,498 | A | * | 2/1995 | Sulkin | F02C 7/222 60/739 |
| 5,927,067 | A | | 7/1999 | Hanloser et al. | |
| 6,038,852 | A | | 3/2000 | Celi | |
| 7,578,131 | B2 | | 8/2009 | Muldoon et al. | |
| 7,647,775 | B2 | | 1/2010 | Muldoon et al. | |
| 8,123,228 | B2 | | 2/2012 | Muldoon et al. | |
| 2009/0050743 | A1 | * | 2/2009 | Barbosa | B64C 17/10 244/135 A |
| 2013/0152590 | A1 | | 6/2013 | Kojovic et al. | |
| 2014/0102112 | A1 | | 4/2014 | Jewess et al. | |

(Continued)

OTHER PUBLICATIONS

EP search report for EP15155794.9 filed Jul. 14, 2015.

*Primary Examiner* — Steven Sutherland
(74) *Attorney, Agent, or Firm* — O'Shea Getz P.C.

(57) ABSTRACT

A pigtail assembly of a fuel supply manifold assembly for a gas turbine engine, includes a first coupling assembly defined along a first axis; a second coupling assembly defined along a second axis, the second axis is parallel to the first axis; a first conduit between the first coupling assembly and the second coupling assembly; a third coupling assembly that defines a third axis, the third axis is non-parallel to the second axis; and a second conduit between the second coupling assembly and the third coupling assembly.

6 Claims, 12 Drawing Sheets

(56) References Cited

U.S. PATENT DOCUMENTS

2014/0130477 A1* 5/2014 Chen .................. F02C 3/22
                                                60/39.463
2015/0020528 A1* 1/2015 Fuller ................ F23R 3/283
                                                60/746

* cited by examiner

FUEL MANIFOLD FOR A GAS TURBINE ENGINE

CROSS-REFERENCE TO RELATED APPLICATION

This application claims priority to U.S. Patent Appln. Ser. No. 61/941,851 filed Feb. 19, 2014, which is hereby incorporated herein by reference in its entirety.

BACKGROUND

The present disclosure relates to a gas turbine engine and, more particularly, to a fuel manifold therefor.

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

A fuel supply system for a gas turbine often includes multiple fuel supply manifolds that deliver fuel to multiple circumferentially distributed fuel injectors. There is typically one fuel supply manifold for each stage. Thus, each fuel injector may have multiple fuel supply connections from multiple fuel supply manifolds.

Each fuel manifold is connected to the one or more fuel injectors by a "pigtail" assembly. As a result of the circumferentially distributed fuel injectors, the piloted and o-ring sealed connections of the pigtail are relatively complicated to install and may present a cross-threading or O-ring damage concern.

SUMMARY

A pigtail assembly of a fuel supply manifold assembly for a gas turbine engine, according to one disclosed non-limiting embodiment of the present disclosure, includes a first coupling assembly defined along a first axis. A second coupling assembly is defined along a second axis that is parallel to the first axis. A first conduit is between the first coupling assembly and the second coupling assembly. A third coupling assembly defines a third axis that is non-parallel to the second axis. A second conduit is between the second coupling assembly and the third coupling assembly.

In a further embodiment of the present disclosure, the first coupling assembly includes an L-coupling adjacent to a manifold coupling.

In a further embodiment of any of the foregoing embodiments of the present disclosure, the manifold coupling includes a "B" nut.

In a further embodiment of any of the foregoing embodiments of the present disclosure, the second coupling assembly includes a T-coupling adjacent to a first fuel nozzle coupling.

In a further embodiment of any of the foregoing embodiments of the present disclosure, the first fuel nozzle coupling includes a "B" nut.

In a further embodiment of any of the foregoing embodiments of the present disclosure, the third coupling assembly includes a second fuel nozzle coupling.

In a further embodiment of any of the foregoing embodiments of the present disclosure, the second fuel nozzle coupling includes a "B" nut.

In a further embodiment of any of the foregoing embodiments of the present disclosure, the second axis is between the first axis and the third axis.

In a further embodiment of any of the foregoing embodiments of the present disclosure, the third axis defines a compound angle with respect to the second axis.

A pigtail assembly of a fuel supply manifold assembly for a gas turbine engine, according to another disclosed non-limiting embodiment of the present disclosure, includes a manifold coupling and an L-coupling adjacent to the manifold coupling. The L-coupling and the manifold coupling are defined along a first axis. A T-coupling is adjacent to a first fuel nozzle coupling. The T-coupling and the first fuel manifold coupling are defined along a second axis. The second axis is parallel to the first axis. A first conduit is between the L-coupling and the T-coupling. A second fuel nozzle coupling defines a third axis. A second conduit is between the T-coupling and the second fuel nozzle coupling.

In a further embodiment of any of the foregoing embodiments of the present disclosure, the third axis is non-parallel to the second axis.

In a further embodiment of any of the foregoing embodiments of the present disclosure, each of the manifold coupling, the first fuel nozzle coupling and the second fuel nozzle coupling includes a "B" nut.

In a further embodiment of any of the foregoing embodiments of the present disclosure, the L-coupling is attached to the first conduit along an axis transverse to the first axis and the second axis.

In a further embodiment of any of the foregoing embodiments of the present disclosure, the second conduit at least partially extends along a manifold conduit attached to the manifold coupling.

In a further embodiment of any of the foregoing embodiments of the present disclosure, the first fuel nozzle coupling and the second fuel nozzle coupling are threadable to a respective first fuel nozzle and a second fuel nozzle.

In a further embodiment of any of the foregoing embodiments of the present disclosure, the third axis defines a compound angle with respect to the second axis.

In a further embodiment of any of the foregoing embodiments of the present disclosure, the second axis is between the first axis and the third axis.

A method of assembling a pigtail assembly of a fuel supply manifold for a gas turbine engine, according to another disclosed non-limiting embodiment of the present disclosure, includes aligning a first coupling assembly into a manifold fitting along a first axis; aligning a second coupling assembly into a first fuel nozzle along a second axis, where the second axis is parallel to the first axis, and where the first coupling assembly is in fluid communication with the second coupling assembly through a first conduit; and aligning a third coupling assembly into a second fuel nozzle along a third axis, where the third axis is non-parallel to the second axis, and where the second coupling assembly is in fluid communication with the third coupling assembly through a second conduit.

In a further embodiment of any of the foregoing embodiments of the present disclosure, the method includes aligning the third coupling assembly into the second fuel nozzle includes deflecting the third coupling assembly by flexing the second conduit.

In a further embodiment of any of the foregoing embodiments of the present disclosure, the method includes: threading a "B" nut of the first coupling assembly to the manifold fitting; threading a "B" nut of the second coupling assembly to the first fuel nozzle; and threading a "B" nut of the third coupling assembly to the second fuel nozzle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment(s). The drawings that accompany the detailed description can be briefly described as follows.

DETAILED DESCRIPTION

Figure 1:
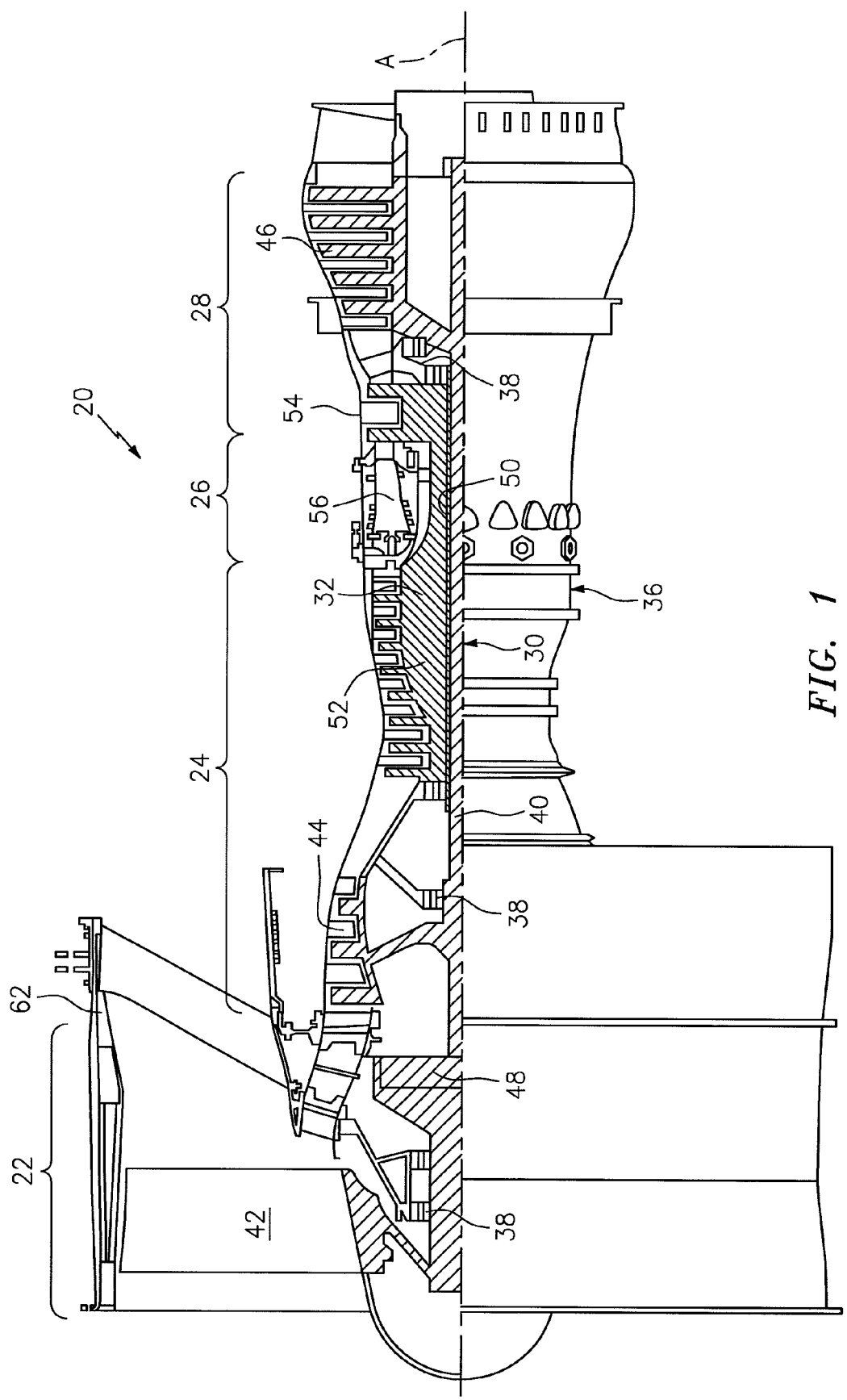
FIG. 1 is a schematic cross-section of an example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air into the compressor section 24 and along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, for example, but not limited to, a three-spool (plus fan) engine.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An example reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded through the HPT 54 and LPT 46. The LPT 46 and HPT 54 rotationally drive the respective low spool 30 and high spool 32 in response to the expansion.

Figure 2:
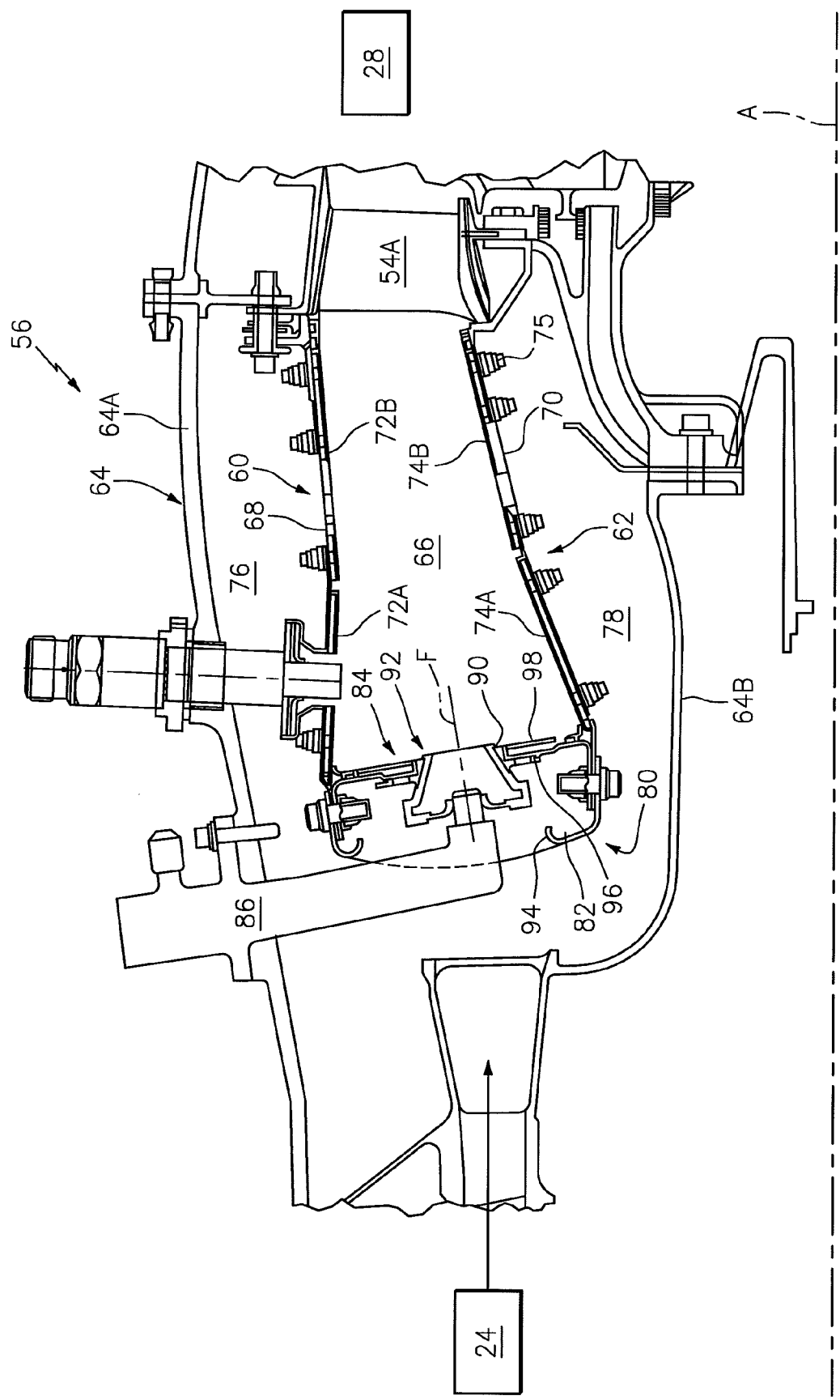
FIG. 2 is a partial longitudinal schematic sectional view of a combustor section according to one non-limiting embodiment that may be used with the gas turbine engine shown in FIG. 1.

With reference to FIG. 2, the combustor 56 generally includes an outer liner 60, an inner liner 62 and a diffuser case module 64. The outer liner 60 and the inner liner 62 are spaced apart such that a combustion chamber 66 is defined therebetween. The combustion chamber 66 is generally annular in shape. The outer liner 60 is spaced radially inward from an outer diffuser case 64A of the diffuser case module 64 to define an annular outer plenum 76. The inner liner 62 is spaced radially outward from an inner diffuser case 64B of the diffuser case module 64 to define an annular inner plenum 78. It should be understood that although a particular combustor is illustrated, other combustor types with various combustor liner arrangements will also benefit herefrom.

The liners 60, 62 contain the combustion products for direction toward the turbine section 28. Each liner 60, 62 generally includes a respective support shell 68, 70 which supports a multiple of heat shields 72, 74 which are attached to a hot side of the respective support shell 68, 70 with fasteners such as studs and nuts.

The combustor 56 also includes a forward assembly 80 immediately downstream of the compressor section 24 to guide compressed airflow C therefrom. The forward assembly 80 generally includes an annular hood 82, a bulkhead assembly 84 and a multiple of swirlers 90 (one shown).

The annular hood 82 extends radially between, and in this disclosed non-limiting embodiment, is secured to, the forwardmost ends of the liners 60, 62. The multiple of circumferentially distributed hood ports 94 accommodate a respective multiple of fuel injectors 86 as well as direct compressed air into the forward end of the combustion chamber 66 through the associated swirler 90. Each fuel injector 86 may be secured to the diffuser case module 64 to project through one of the hood ports 94 and the respective swirler 90. It should be appreciated that various architectures of the forward assembly 80 will also benefit herefrom.

Each swirler 90 in this disclosed non-limiting embodiment is circumferentially aligned with its respective hood port 94 to project through the bulkhead assembly 84. The bulkhead assembly 84 includes a bulkhead support shell 96 secured to the liners 60, 62, and a multiple of circumferentially distributed bulkhead heat shields 98 secured to the bulkhead support shell 96 around each swirler 90.

The forward assembly 80 and liners 60, 62 introduce core combustion air into the forward end of the combustion chamber 66 while the remainder enters the annular outer plenum 76 and the annular inner plenum 78. The multiple of fuel injectors 86 and swirlers 90 facilitate the generation of a blended fuel-air mixture that supports combustion in the combustion chamber 66.

Opposite the forward assembly 80, the outer and inner support shells 68, 70 interface with a first row of Nozzle Guide Vanes (NGVs) 54A of the HPT 54 in this disclosed non-limiting embodiment. The NGVs 54A are located immediately downstream of the combustor 56 as the first static vane structure upstream of a first turbine rotor in the turbine section 28. The NGVs 54A are static engine components which direct core airflow combustion gases onto the turbine blades of the first turbine rotor in the turbine section 28 to facilitate the conversion of pressure energy into kinetic energy. The combustion gases are also accelerated by the NGVs 54A because of their convergent shape and typically provide a "spin" or a "swirl" in the direction of turbine rotor rotation. The turbine rotor blades absorb this energy to drive the turbine rotor.

Figure 3:
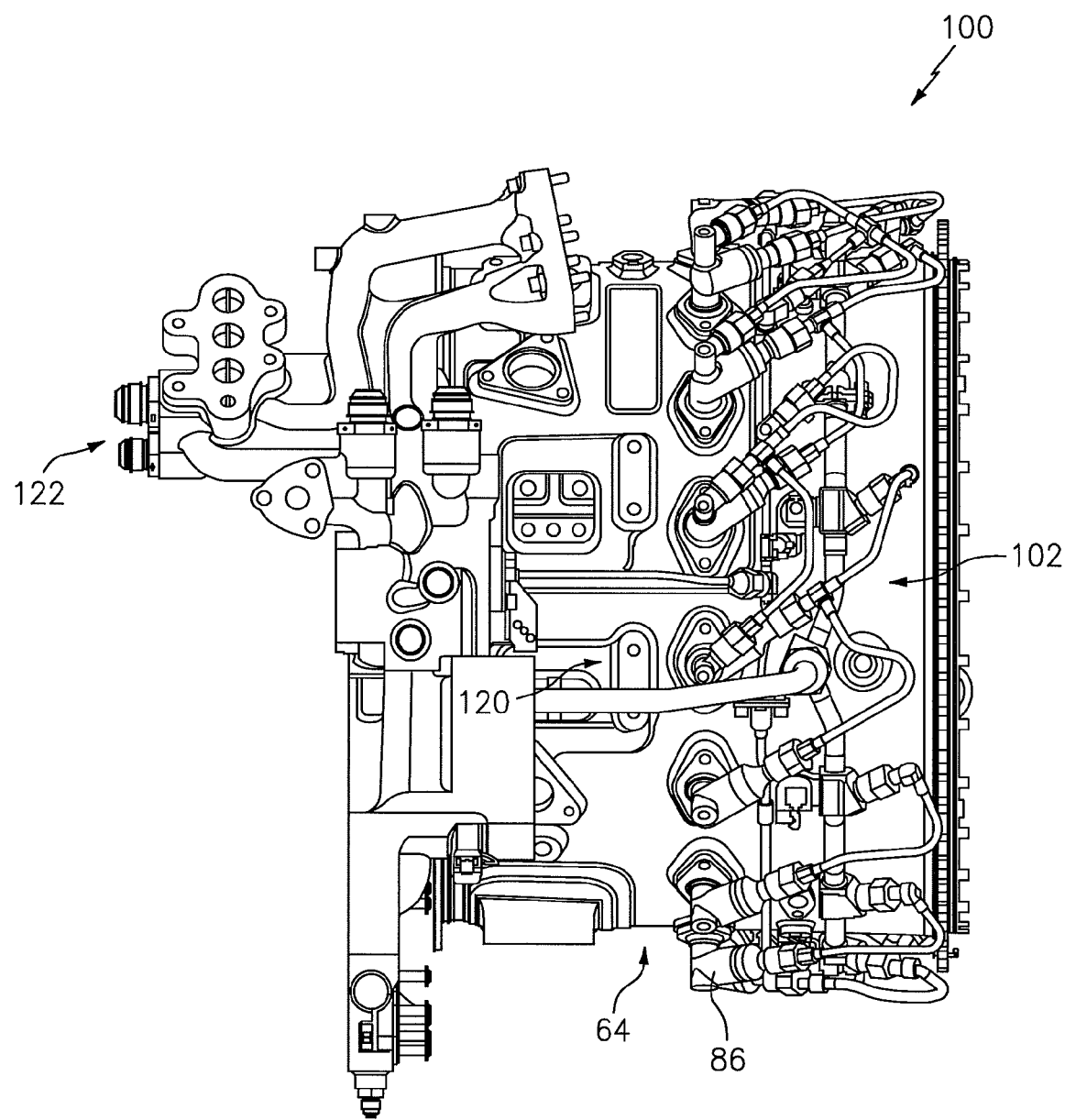
FIG. 3 is a perspective view of a fuel supply manifold assembly around a diffuser case module.

With reference to FIG. 3, a fuel supply manifold assembly 100 generally includes at least one fuel supply manifold 102 to which the multiple of fuel injectors 86 are connected. The fuel supply manifold 102 is generally arranged circumferentially around the diffuser case module 64 to communicate fuel to the multiple of fuel injectors 86. It should be appreciated that various fuel injector systems, manifolds, and geometries will benefit herefrom.

Figure 4:
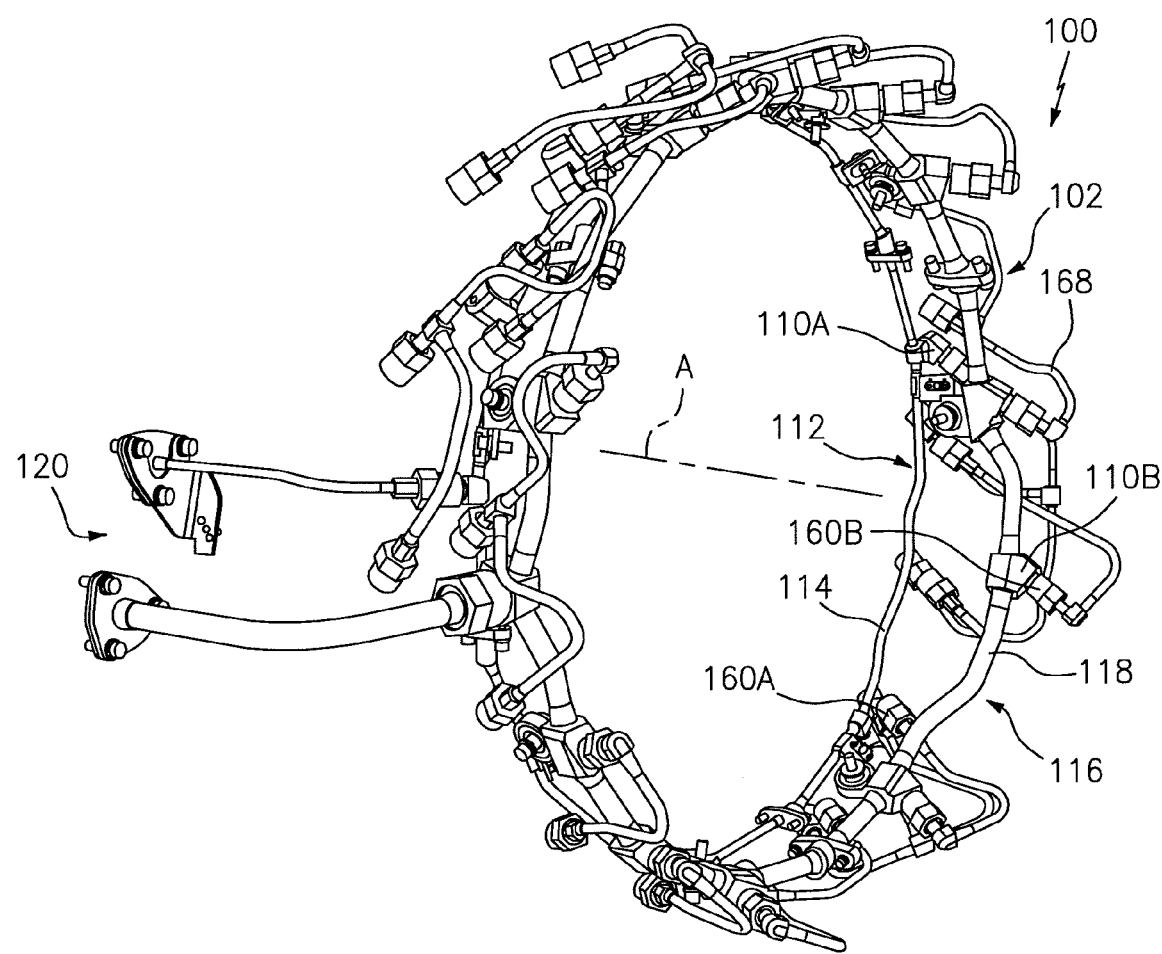
FIG. 4 is a perspective view of the fuel supply manifold assembly of FIG. 3.

With reference to FIG. 4, the fuel supply manifold 102 in the depicted embodiment may include multiple segments around a diffuser case module 64 (see FIG. 3) that includes a multiple of manifold fittings 110A of a primary fuel circuit 112 with a multiple of primary fuel tubes 114, and a multiple of manifold fittings 110B of a secondary fuel circuit 116 with a multiple of secondary fuel tubes 118. In one example, the primary manifold is split into four tube section, while the secondary manifold is split into three roughly even tube sections A fuel manifold feed subassembly 120 communicates fuel into both the primary fuel circuit 112 and the secondary fuel circuit 116 from, for example, a Fuel/Oil Manifold 122 (see FIG. 3). Each manifold fitting 110A, 110B includes a respective pigtail interface 160A, 160B. The pigtail interface 160A includes a respective primary pigtail port in communication with the primary fuel circuit 112, and the pigtail interface 160B includes a secondary pigtail port in communication with the secondary fuel circuit 116. The primary and secondary pigtail port may be threaded to respectively receive a pigtail assembly 168 for communication of fuel to the fuel injectors 86.

Figure 5:
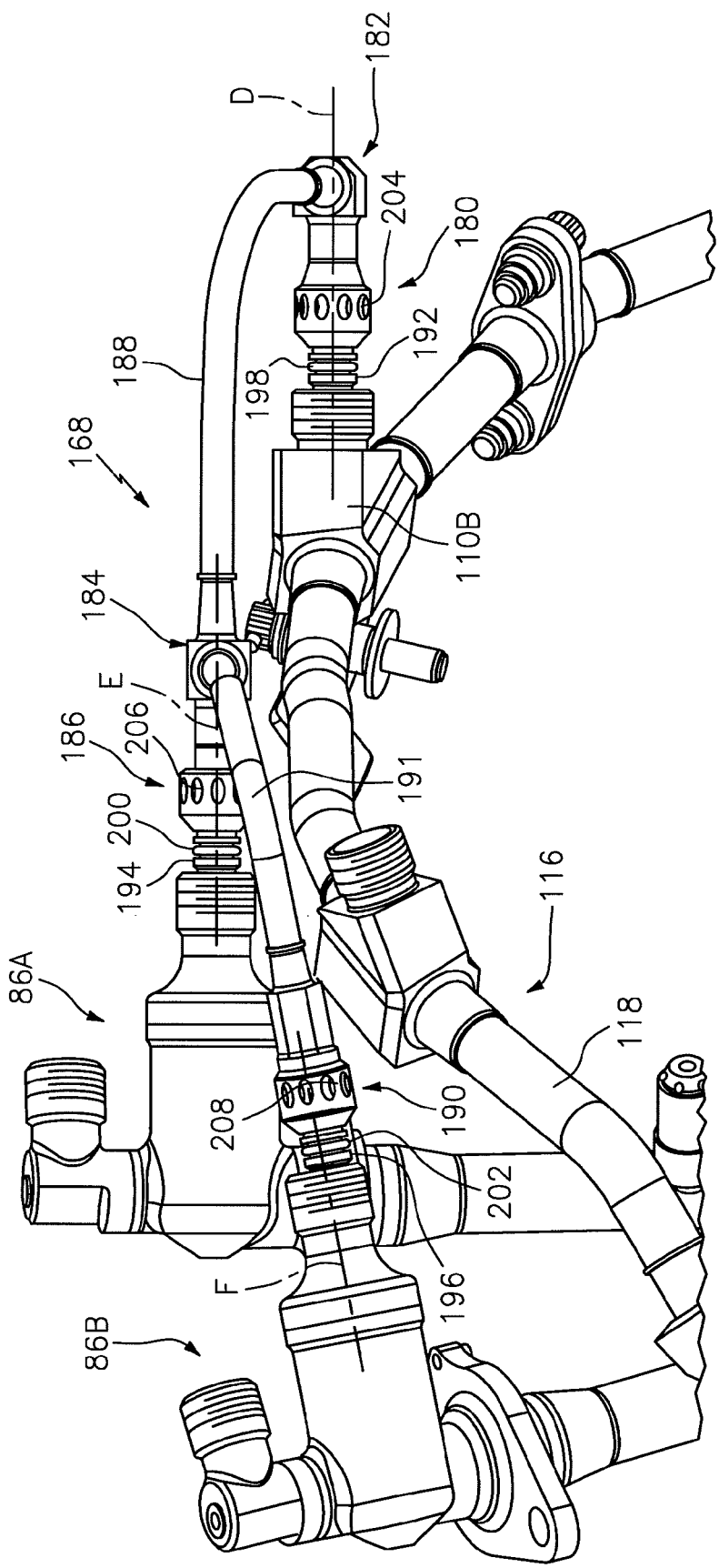
FIG. 5 is a side view of one pigtail assembly of a secondary fuel supply manifold of the fuel supply manifold assembly.

With reference to FIG. 5, a portion of the secondary fuel circuit 116 with one associated pigtail assembly 168 is illustrated, however, other pigtail assemblies in either or both the primary and secondary fuel circuit will also benefit herefrom. In this disclosed non-limiting embodiment, each pigtail assembly 168 is associated with one secondary pigtail port in one (1) manifold fitting 110B to communicate fuel to the (2) respective fuel injectors 86.

Each pigtail assembly 168 generally includes a manifold coupling assembly 180, an L-coupling 182, a T-coupling 184, a first fuel nozzle coupling assembly 186, a first conduit 188 between the L-coupling 182 and the T-coupling 184, a second fuel nozzle coupling assembly 190, and a second conduit 191 between the T-coupling 184 and the second fuel nozzle coupling assembly 190. It should be appreciated that although particular systems and subsystems are separately defined, each or any of the subsystems may be otherwise combined or segregated. Further, although particular coupling types such as "L" and "T" type couplings are illustrated, it should be appreciated that various other couplings will also benefit herefrom.

Each of the manifold coupling assembly 180, the first fuel nozzle coupling assembly 186 and the second fuel nozzle coupling assembly 190 includes a respective piloted fitting 192, 194, 196 with an O-ring 198, 200, 202, and a B-nut 204, 206, 208 that is screwed onto the respective manifold fittings 110, the first fuel injector 86A, and the second fuel injector 86B to secure the pigtail assembly 168.

Figure 6:
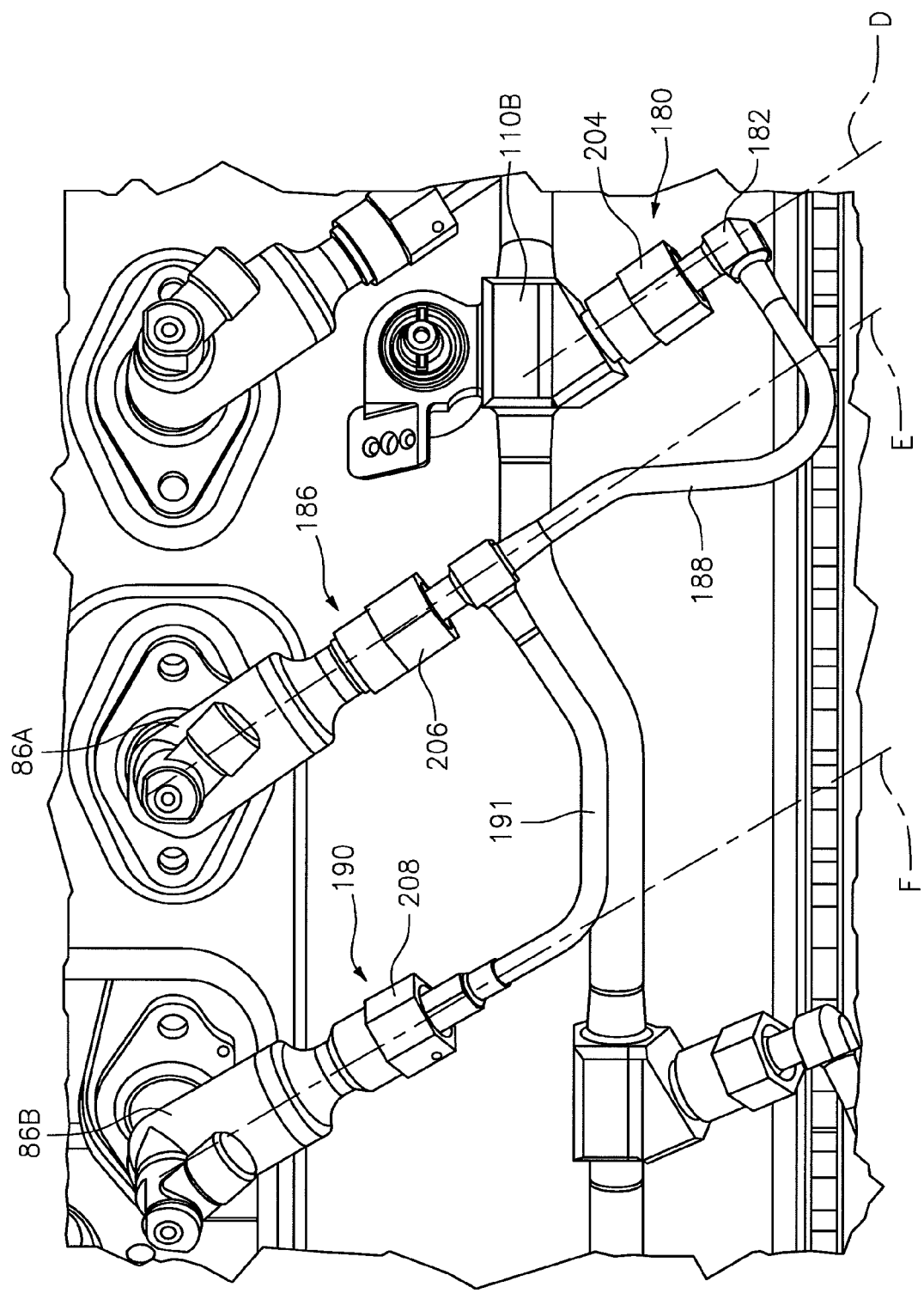
FIG. 6 is a top view of the pigtail assembly of FIG. 5.

With reference to FIG. 6, the manifold coupling assembly 180 defines a first axis D, the first fuel nozzle coupling assembly 186 defines a second axis E, and the second fuel nozzle coupling assembly 190 defines a third axis F. Each axis defines the free state of each branch of the pigtail assembly 168. In one disclosed non-limiting embodiment, the second axis E is between the first axis D and the third axis F, the first axis D is parallel to the second axis E, and the third axis F is non-parallel to the first axis D and the second axis E.

Figure 7:
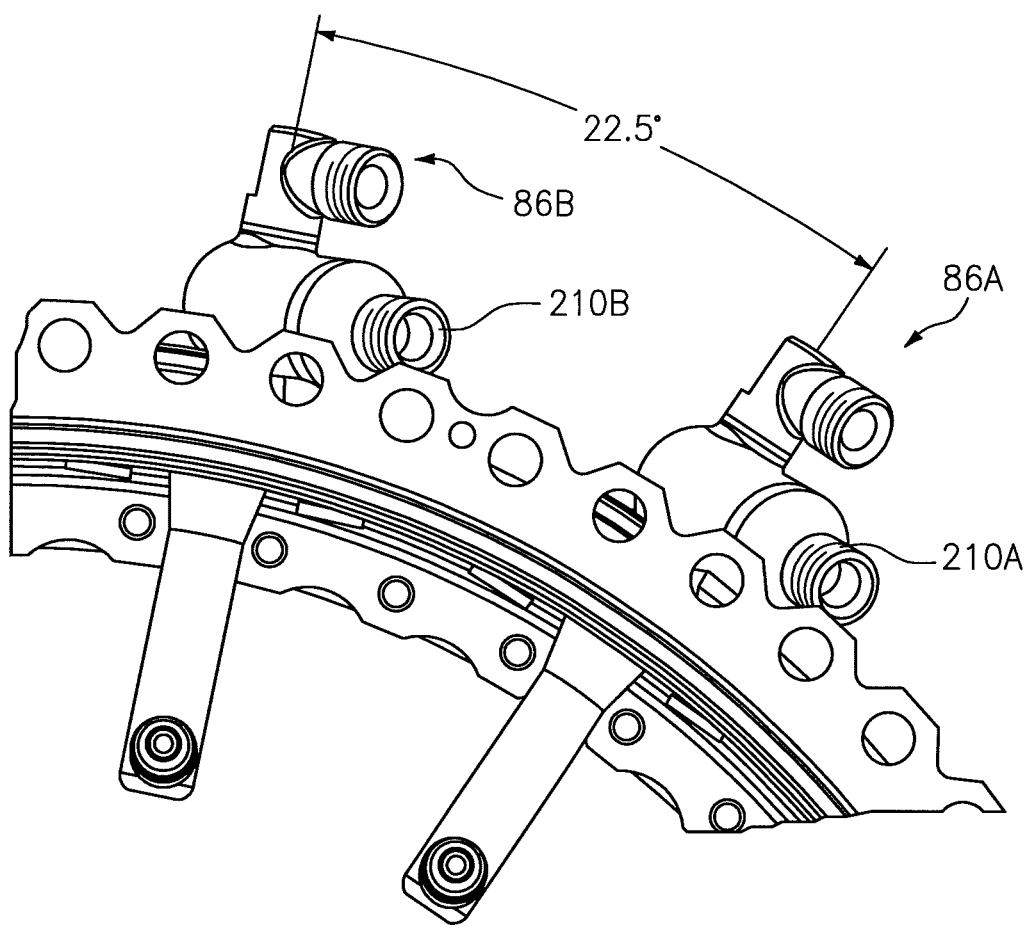
FIG. 7 is a perspective aft looking forward view of two fuel injectors as mounted to the diffuser case module.
Figures 8, 9:
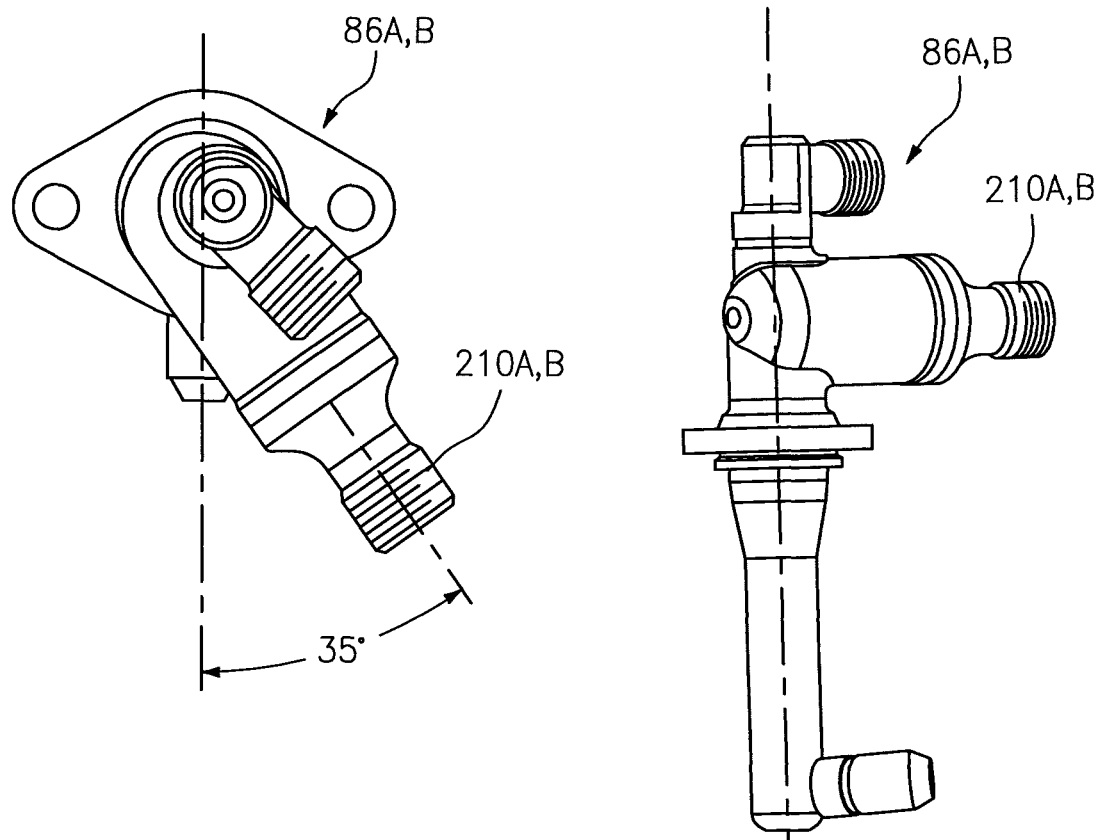
FIG. 8 is a top view of each fuel injector as mounted to the diffuser case module.
FIG. 9 is a side view of each fuel injector as mounted to the diffuser case module.
Figure 10:
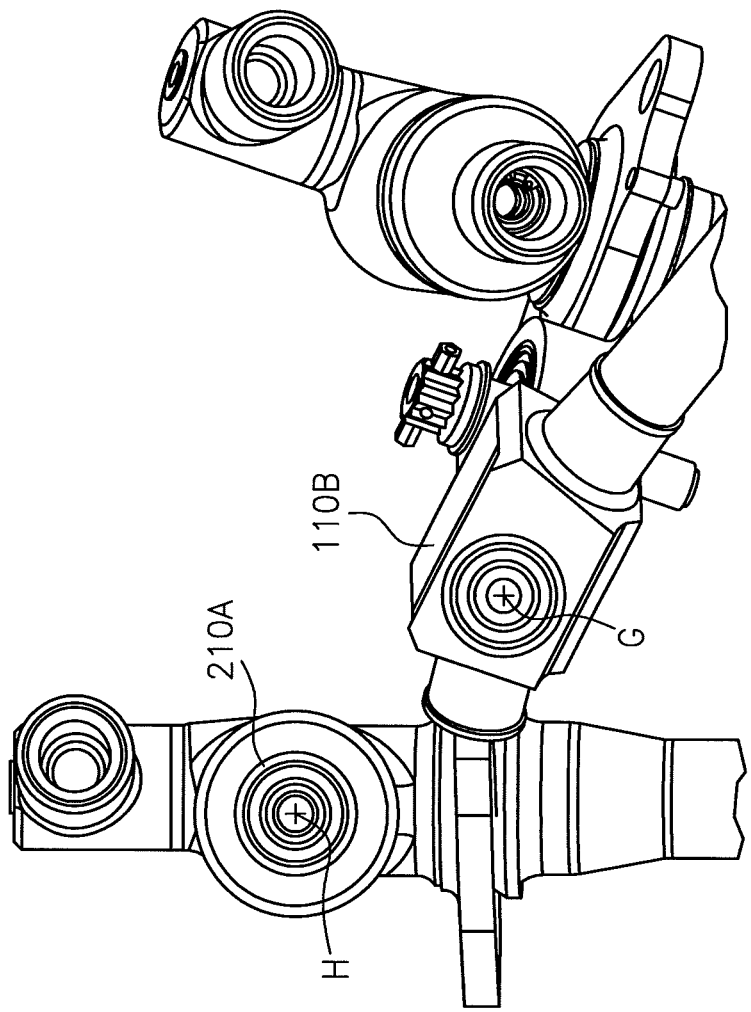
FIG. 10 is a perspective view normal to an axis of a first nozzle of two fuel injectors with respect to an associated manifold fitting as mounted to the diffuser case module.
Figure 10:
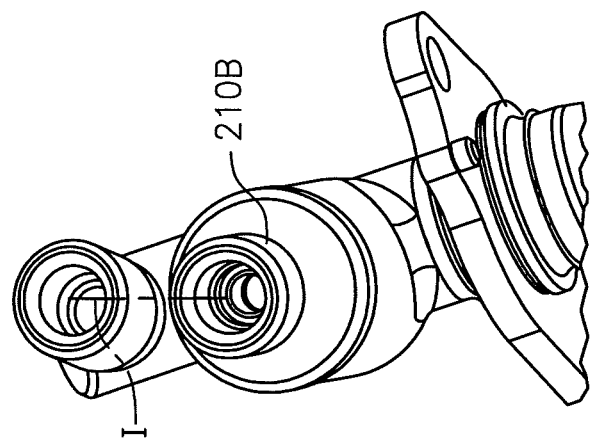

In this disclosed non-limiting embodiment, the first fuel injector 86A and second fuel injector 86B are separated by about 22.5 degrees around the engine axis A (see FIG. 7) and a secondary fuel injector port 210A, 210B is angled at about 35 degrees with respect to the engine axis A (see FIG. 8). Further, each fuel injector 86A, 86B is tipped at an angle of about 92 degrees with respect to the engine axis A to define port axes G, H, I (see FIG. 10).

Figures 11, 14:
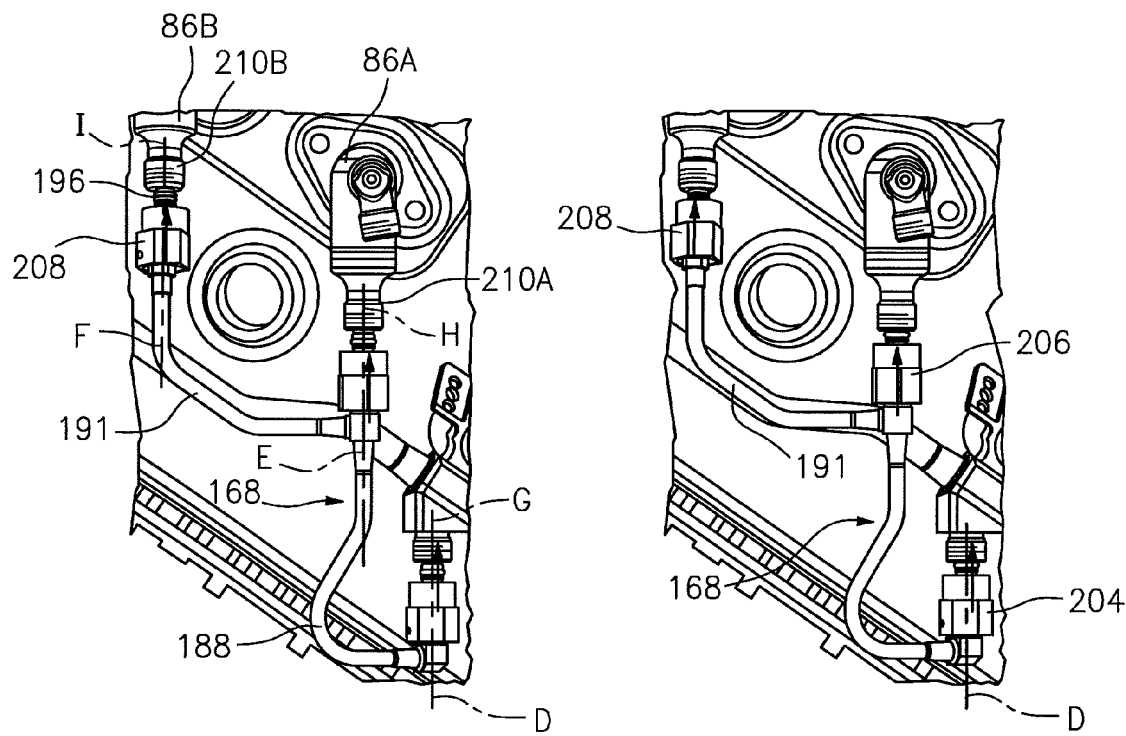
FIG. 11 is a top view of one pigtail assembly in a first preinstalled axial position and in a free state.
FIG. 14 is a top view of the pigtail assembly in a second axial position with the outermost fitting being deflected and partially engaged with the fuel injector port.
Figure 12:
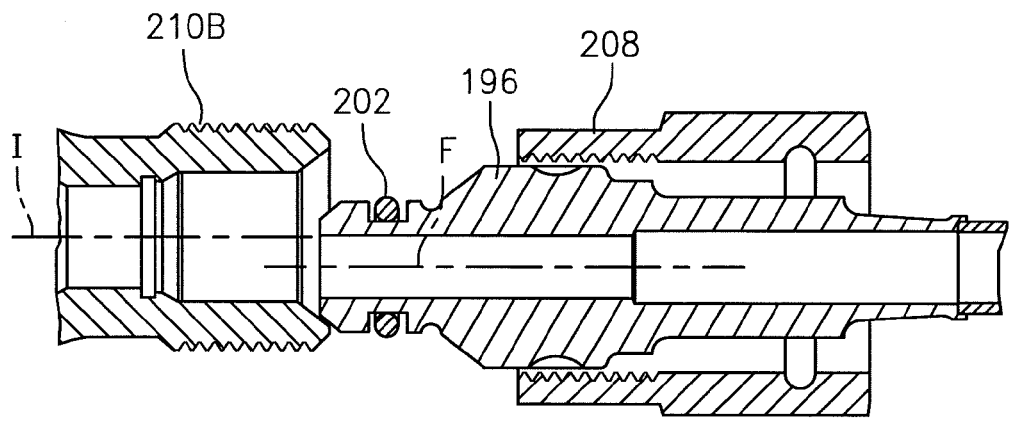
FIG. 12 is a sectional view of the outermost fitting of the pigtail assembly of FIG. 10 at the first axial position.
Figure 13:
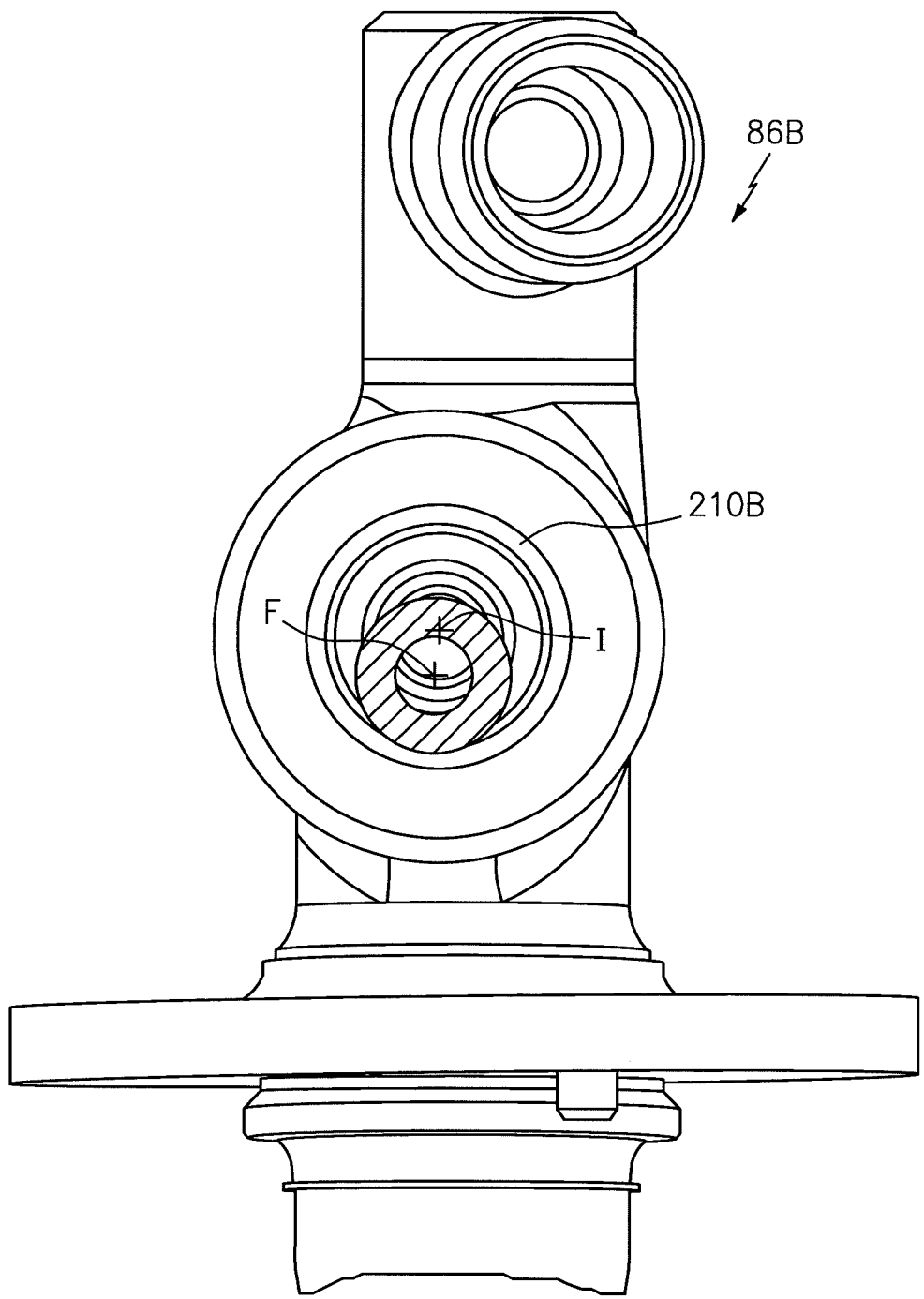
FIG. 13 is a perspective view normal to the axis of the first nozzle of the outermost fitting of the pigtail assembly of FIG. 11 at the first axial position prior to the outermost fitting being deflected for engagement with the fuel injector port.

With reference to FIG. 11, the pigtail assembly 168 is installed along axis D and axis E with the B-nuts 204, 206, 208 retracted. Here, the piloted fitting 196 has not yet aligned with the fuel injector port 210B of the second fuel injector 86B such that axes F and I are off-concentric by about 0.085" (2.2 mm) (see FIGS. 12 and 13) at this axial pre-installed position. That is, at "free state" for this axial preinstalled position, the piloted fitting 196 is off-axis I by about 0.085" (2.2 mm) toward the about 7 O'clock position (see FIG. 13).

The manifold coupling assembly 180 and the first fuel nozzle coupling assembly 186 are respectively installed coaxially along axis G and axis H. That is, the piloted fittings 192, 194 are axially installed directly along axes G and H. As such, the shorter length of first conduit 188 does not need to flex or deform to engage the piloted fitting 194 with the fuel injector port 210A of the first fuel injector 86A. The second conduit 191, however, is off axis I of the second fuel injector 86B at this axial preinstalled position. The second conduit 191 is relatively long, however, and therefore has more flexibility to be slightly deflected for initial engagement with the fuel injector port 210B of the second fuel injector 86B.

With reference to FIG. 14, the pigtail assembly 168 is moved axially along axes D, G and E, H and the second conduit 191 is temporarily deflected to align the piloted fitting 196 with the off-angle second fuel injector 86B along axis I. That is, at this axial position, the second conduit 191 is temporarily deflected and not in free state for proper insertion.

Figures 15, 17:
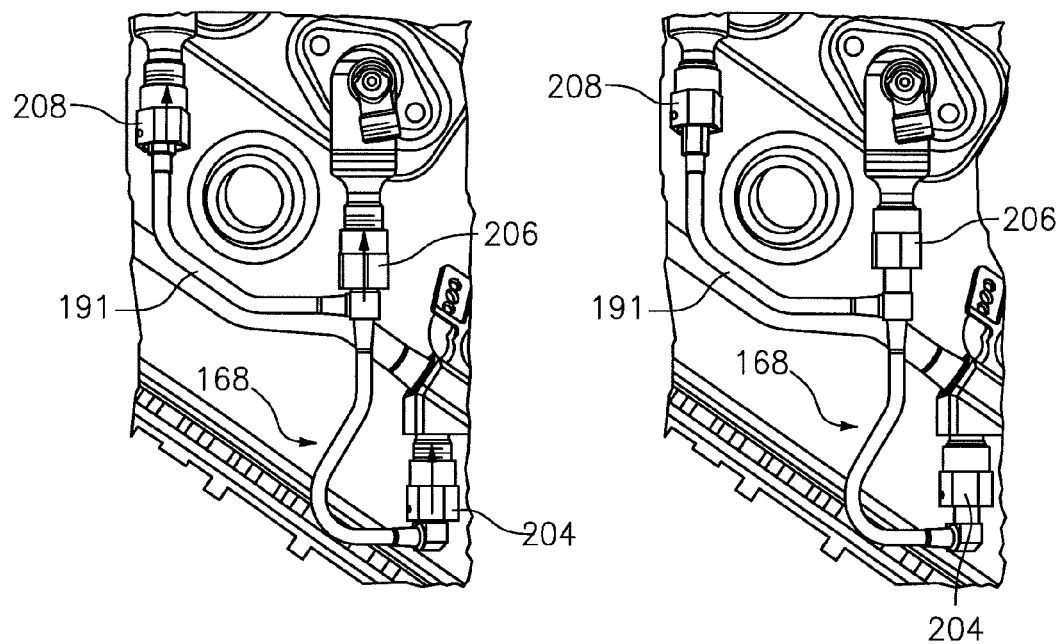
FIG. 15 is a top view of the pigtail assembly in a third fully inserted axial position with the outermost fitting being fully engaged with the fuel injector port and in a free state.
FIG. 17 is a top view of the pigtail assembly in the third fully inserted axial position with the B-nuts threaded onto the respective fuel injector port.
Figure 16:
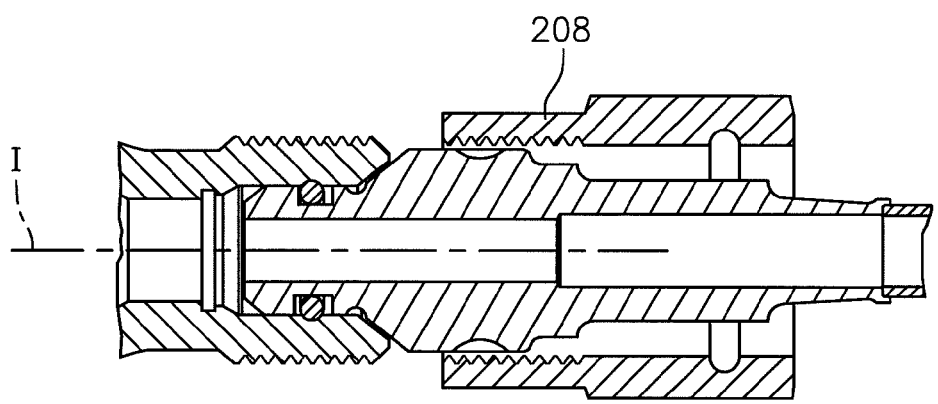
FIG. 16 is a sectional view of the outermost fitting of the pigtail assembly of FIG. 10 at the third fully inserted axial position of FIG. 15.

With reference to FIG. 15, the piloted fitting 196 is fully engaged with the fuel injector port 210B of the second fuel injector 86B and at this fully installed axial position, the second conduit 191 is again in its "free state" (see FIG. 16).

Figure 18:
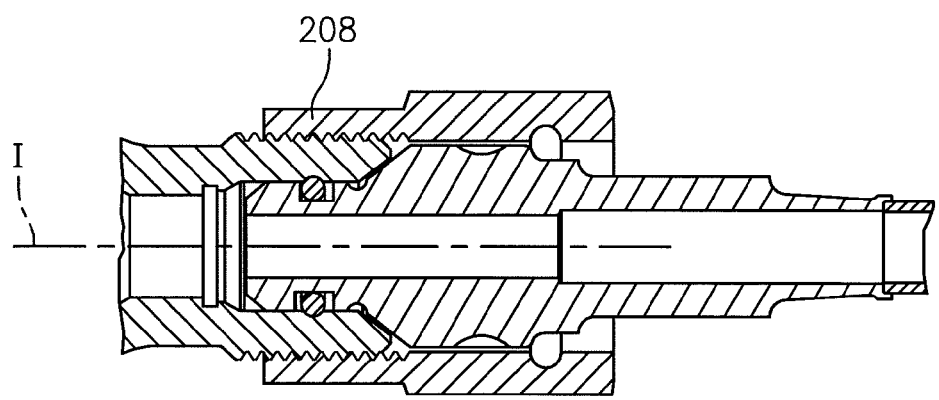
FIG. 18 is a sectional view of the outermost fitting of the pigtail assembly of FIG. 17 at the third fully inserted axial position with the B-nut threaded onto the fuel injector port.

With reference to FIGS. 17 and 18, the B-nuts 204, 206, 208 are then secured. The concept of remaining parallel with the closer fuel nozzle allows the usage of a pigtails 168 that feed multiple fuel nozzles yet reduces/minimizes—if not eliminates—concern of cross threading or cutting an O-ring during installation.

It should be understood that relative positional terms such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A pigtail assembly of a fuel supply manifold assembly for a gas turbine engine, the pigtail assembly comprising:
    a manifold coupling;
    an L-coupling adjacent to the manifold coupling, the L-coupling and the manifold coupling defined along a first axis;
    a first fuel nozzle coupling;
    a T-coupling adjacent to the first fuel nozzle coupling, the T-coupling and the first fuel nozzle coupling defined along a second axis, the second axis parallel to the first axis;
    a first conduit between the L-coupling and the T-coupling;
    a second fuel nozzle coupling that defines a third axis; and
    a second conduit between the T-coupling and the second fuel nozzle coupling;
    wherein the second conduit at least partially extends along a manifold conduit attached to the manifold coupling.

2. The pigtail assembly as recited in claim 1, wherein the third axis is non-parallel to the second axis.

3. The pigtail assembly as recited in claim 1, wherein each of the manifold coupling, the first fuel nozzle coupling and the second fuel nozzle coupling includes a "B" nut.

4. The pigtail assembly as recited in claim 1, wherein the L-coupling is attached to the first conduit along an axis transverse to the first axis and the second axis.

5. The pigtail assembly as recited in claim 1, wherein the second axis is between the first axis and the third axis.

6. A pigtail assembly of a fuel supply manifold assembly for a gas turbine engine, the pigtail assembly comprising:
    a manifold coupling;
    an L-coupling adjacent to the manifold coupling, the L-coupling and the manifold coupling defined along a first axis;
    a first fuel nozzle coupling;
    a T-coupling adjacent to the first fuel nozzle coupling, the T-coupling and the first fuel nozzle coupling defined along a second axis, the second axis parallel to the first axis;
    a first conduit between the L-coupling and the T-coupling;
    a second fuel nozzle coupling that defines a third axis; and
    a second conduit between the T-coupling and the second fuel nozzle coupling;
    wherein the first fuel nozzle coupling and the second fuel nozzle coupling are threadable to a respective first fuel nozzle and a second fuel nozzle.

* * * * *